United States Patent [19]
Koepke

[11] 4,085,172
[45] Apr. 18, 1978

[54] HIGH STRENGTH HALIDES

[75] Inventor: Barry G. Koepke, Burnsville, Minn.

[73] Assignee: Honeywell Inc., Minneapolis, Minn.

[21] Appl. No.: 619,264

[22] Filed: Oct. 3, 1975

Related U.S. Application Data

[63] Continuation of Ser. No. 445,394, Feb. 25, 1974, abandoned.

[51] Int. Cl.² ............................................. B29D 11/00
[52] U.S. Cl. ......................................... 264/1; 264/66; 264/235; 264/332
[58] Field of Search ...................... 264/1, 66, 332, 235, 264/346

[56] References Cited

U.S. PATENT DOCUMENTS 3,933,970  1/1976  Rosette et al. ........................... 264/1

Primary Examiner—Robert F. White
Assistant Examiner—John Parrish
Attorney, Agent, or Firm—Omund R. Dahle

[57] ABSTRACT

Fine-grained polygonized halide bodies are formed having comparable optical properties to a single crystal halide body. Heat and force are applied to a single crystal halide to recrystallize or polygonize the halide. The body is then annealed to suppress room temperature grain growth.

3 Claims, 5 Drawing Figures

|200μm|

|200μm| ns in infrared systems.

HIGH STRENGTH HALIDES

ORIGIN OF THE INVENTION

The present invention was made under a contract with the Department of Defense.

This is a continuation, of application Ser. No. 445,394, filed Feb. 25, 1974, now abandoned.

REFERENCE TO RELATED APPLICATIONS

Reference should be made to co-pending patent applications By. R. H. Anderson entitled "Preparation of High Strength Halide Bodies" Ser. No. 445,371, and by E. Bernal G., B. G. Koepke, and R. B. Maciolek entitled "High Strength Halide Alloys" Ser. No. 445,393, which were filed on the same date (Feb. 25, 1974) as this application.

BACKGROUND OF THE INVENTION

This invention is concerned with the formation of fine-grained polygonized halide bodies. In particular, the present invention is concerned with the preparation of high strength halide bodies for use as optical components in infrared systems.

One of the more critical problems encountered in the development of high power infrared lasers is the development of laser windows which are highly transparent to laser radiation at 10.6 microns and at 3 to 5 microns. At the present time, considerable research effort has been devoted to the development of laser windows from the co-called covalent compounds consisting typically of II-VI compounds such as cadmium telluride, zinc telluride and zinc selenide. The need for improved laser window materials, however, is well known. F. Horrigan et al, "Windows for High Power Lasers," Microwaves, Page 68 (January, 1969); M. Sparks, "Optical Distortion by Heated Windows in High Power Laser System," J. Appl. Phys., 42, 5029 (1971).

The need for improved laser windows is based on the extremely high laser power throughput required and the fact that the laser windows constitute structural members. In order to maintain high throughput and minimize adverse effects, the amount of energy transferred to the window must be kept low. Laser beam energy can be transferred to the window in two ways: heating of the window caused by either bulk or surface absorption of the beam, or direct conversion of the beam energy to mechanical energy by Brillouin scattering or electrostriction. This energy transfer produces several undesirable effects such as lensing and birefringence, which result in degradation of beam quality and polarization. In extreme cases, severe thermal stresses can be produced in the windows. These stresses, which are further aggravated by the fact that the windows are mounted in a cooling clamp, may lead to fracture of the windows.

The low absorption coefficients of the halides make them outstanding candidates for optical components in infrared systems. The alkali halides exhibit low absorption at 10.6 microns, and the alkaline earth halides exhibit low absorption in the 2 to 6 micron region. Furthermore, because the temperature coefficient of the index of refraction and the thermal expansion have opposite signs, the two effects tend to compensate optical path changes due to temperature, making these materials useful in applications in which heating by a laser beam is anticipated. Halide crystals, however, have low yield strengths and are highly susceptible to plastic deformation. J. J. Gilman, "Plastic Anisotropy of LiF and Other Rock Salt Type Crystals, " Acta Met., 7, 608 (1959). These mechanical properties of single crystal alkali halides have precluded their use as high power laser windows.

The outstanding transparency of the halide materials makes it very attractive to attempt to overcome their mechanical deficiencies. Halides can be strengthened without altering their optical properties by hot working of single crystals to produce fully dense polycrystalline material. R. J. Stokes andd C. H. Li, Materials Science Research, Vol. 1, pages 133–157, edited by H. H. Stadelmaier and W. W. Austin, Plenum Press, New York, 1963; N. S. Stoloff et al, "Effect of Temperature on the Deformation of KCl-KBr Alloys," J. Appl. Phys., 34, 3315 (1963); and R. J. Stokes, "Mechanical Properties of Polycrystalline Ceramics," Proc. Brit. Ceram. Soc., 189 (1966). This technique involves the deformation and recrystallization of crystals at elevated temperatures to introduce grain boundaries, thereby producing polycrystalline halide materials. The techniques described in these articles involved the extrusion of halide materials.

Fine-grained polygonized halide bodies may also be produced by pressing, rolling, or a combination of pressing and rolling. The previously mentioned patent application by R. H. Anderson describes a process for forming fine-grained halide bodies at low temperatures by use of a constraint technique. This technique yields structures which are extremely fine-grained and which can exhibit yield strengths over an order of magnitude higher than the starting single crystal billet. A further advantage of this process is that under certain conditions (temperature, strain rate, initial crystal orientation) the optical properties of the polygonized billet are identical to those of single crystal material.

One problem which has been discovered in fine-grained polygonized halide billets formed by hot working is a rapid and extensive grain growth at room temperature. This behavior occurs in both unconstrained and constrained billets which are hot worked at low temperatures. This room temperature grain growth is undesirable, since polygonized halides having a small grain size exhibit higher strength than halides having larger grain size.

SUMMARY OF THE INVENTION

Room temperature grain growth in hot worked halide bodies may be suppressed by an annealing process. In the present invention, the fine-grained body formed by hot working is annealed at a temperature at which room temperature grain growth in the fine-grained body is suppressed.

DESCRIPTION OF THE PREFERRED EMBODIMENTS

Microstructural Stability in As-Worked Pure KCl Billets

The fine-grained structure produced in pure alkali halides during hot working can undergo rapid and extensive grain growth at room temperature. Although this behavior is not unique to pure KCl, the present application will discuss this phenomenon in pure KCl which has been hot worked by three techniques. These techniques are constrained and unconstrained press forging and constrained rolling. The constrained hot working techniques were discussed in detail in the copending patent application by R. H. Anderson Ser. No. 445,731 entitled "Preparation of High Strength Halide Bodies." In the constrained hot working techniques, the starting cylindrical crystal billet is surrounded with a metal ring. During hot working the expanding ring exerts a compressive hoop stress on the deforming crystal and inhibits cracking. With the use of a constraining ring, crystals have been worked to reductions up to 80% in height by press forging and have been cross rolled up to 45% reduction in thickness without cracking. The temperatures in both cases range from about 150° to about 300° C. Strain rates ranging from 0.001 to 0.1 minutes$^{-1}$ were used in pressing; the strain rate range in rolling was an order of magnitude higher. In most cases, crystals were pressed along <100> directions and rolled on {100} faces in <100> directions.

Figure 1:
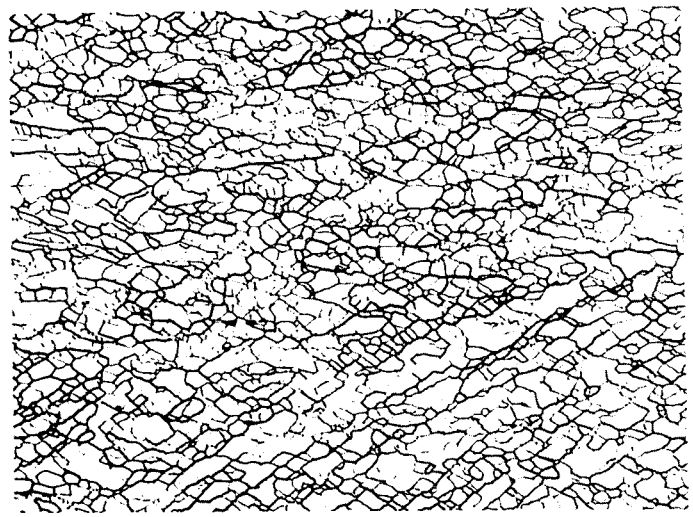
FIG. 1 is a photograph of the fine grain structure of a hot rolled KCl billet.

The fine-grained microstructures produced in KCl crystals by all of these hot working methods are similar. An example showing the structure of a hot rolled KCl crystal is given in FIG. 1. The mean grain size of this particular sample is 3 microns.

Figure 2:
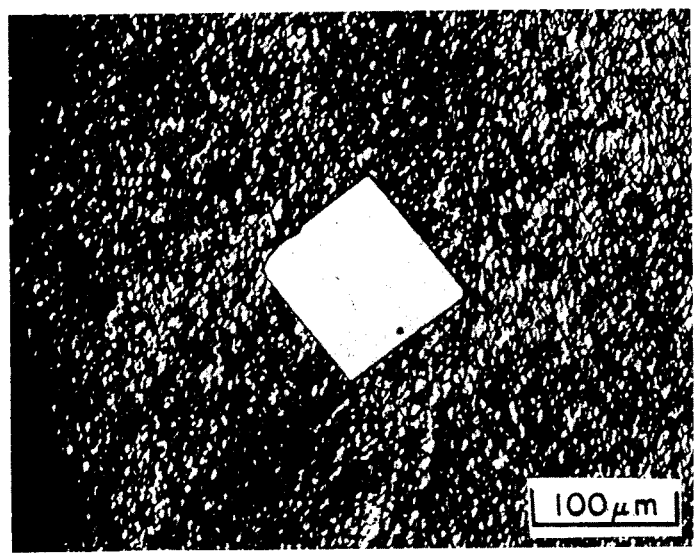
FIG. 2 is a photograph showing a large grain growing at room temperature in a press forged KCl billet.
Figure 3:
FIG. 3 is a photograph showing large grains having boundaries of general curvature in a hot worked KCl billet.

When the hot worked billets were allowed to sit at room temperature, single, isolated grains formed in the billets and grew at an alarming rate. In some cases these large grains consumed most of the fine-grained matrix within a week. An example of a large grain growing at room temperature in a press forged crystal is shown in FIG. 2. The morphology exhibited by the grains shown in FIG. 2 was common and many of the large grains observed had such straight, well defined boundaries. Two surface trace analyses performed on these grains oriented by Laue back reflection photographs indicated that the straight boundaries were primarily defined by {100}. In some instances, the boundaries of the grains had general curvatures shown in FIG. 3. The tendency to form idiomorphic shapes such as shown in FIG. 2 increased with increasing total strain and decreasing working temperature.

Figure 4:
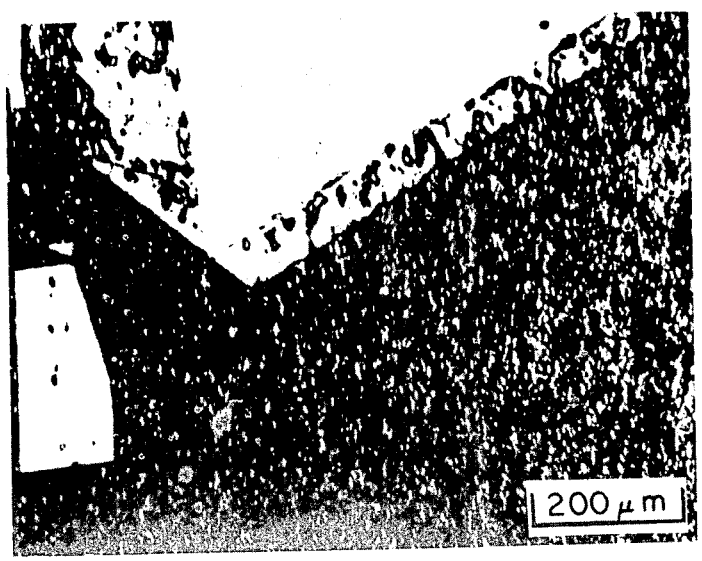
FIG. 4 is a photograph showing a hot worked KCl billet containing large grains that have been repolished and etched after a period of one hour at room temperature. The amount of boundary migration occurring in that time can be seen.

Boundary migration during room temperature grain growth was observed by standard metallographic procedures. FIG. 4 shows a sample containing large grains that was repolished and etched after a period of one hour had elapsed at room temperature. The previously etched surface had only been partially removed, and the initial and final positions of the boundaries are clearly delineated. The right hand boundary had migrated at a rate of 1 micron per minute and the boundary on the left at a rate of 2.4 microns per minute. These rates can only be taken as upper limits since the angle the boundaries made with the surface were not known.

Many observations of a large number of grains undergoing room temperature growth established the following: 1) Straight boundaries tended to remain straight and to migrate in a direction perpendicular to themselves. 2) Most boundary migration rates at room temperature ranged from 0.1 to 1.0 microns per minute and were fairly constant with time, thus indicating a constant driving force. 3) At room temperature the migration rates of straight boundaries in both hot pressed and hot rolled KCl were in the same range. 4). The migration boundaries tended to follow deformation bands in the deformed structures whenever such bands were observed.

Several additional observations were made of as-rolled pure KCl billets. It was routine procedure to cut three bend test bars from each rolled billet. After testing, the microstructure of every bar was photographed. The microstructural stability of these bars was then determined by re-examining the bars for the presence of large grains after a time lapse of a number of weeks. These observations were made on bars cut from 10 rolled KCl billets. Six were rolled at 250° C and four were rolled at 200° C. All were cross rolled on a {100} face in <100' directions. This series included billets given two, four, and six passes corresponding to 10% true compressive strain per pass at both temperatures.

The results of observations on these rolled billets indicated that all samples given six passes underwent grain growth. Only one isolated case of grain growth was observed for samples given four passes. No grain growth was noted in samples given two passes. No apparent effect of rolling temperature (i.e. 200° or 250° C) on the appearance of the large grains was noted.

It should be noted that all bend tests were made within two or three days from the time the billets were rolled. In all samples examined, the large grains were seldom observed upon initial examination of the microstructure of the broken bend test bars. It should also be noted that the bend test bars were cut from the central portions of the disk shaped billets. Large grains have been noted in times shorter than two days on the top and bottom surfaces of the billets at their outer edges, but not in the central regions.

These observations have pointed out two additional factors concerning room temperature grain growth in hot rolled pure KCl. First, a critical strain appeared necessary which, in the case of rolling, was in the vicinity of 40%. Second, the formation of the grain occurred after an incubation period at room temperature that was on the order of two or three days.

Effects of Post-Forming Heat Treatments on Grain Growth

Further experiments were performed to determine the incubation period and growth rates of grain growth in hot worked KCl. Most importantly, experiments were performed to determine whether post-forming heat treatments could retard or totally suppress grain growth.

KCl billets given six passes (60 percent strain) at 200° were used for all observations since this treatment always resulted in material that exhibited grain growth as discussed above. Immediately after rolling, the billets were annealed for 1 hour at temperatures ranging from 50° to 450° C and then air cooled. They were then sectioned into at least five pieces (of which three were used for bend tests). The microstructures of transverse faces of these pieces were periodically examined up to 10 days following the heat treatment. The time for large grains to form as well as their growth rates were noted. Heat treatments were carried out in hot silicone oil up to 350° C and in air at temperatures higher than this. When the annealing temperatures were less than 200° C, billets were both quenched and air cooled to the annealing temperature. The quenched samples cracked and bend tests bars could not be obtained.

The effects of the various heat treatments on the appearance and growth of large grains in hot-rolled KCl are shown in Table 1. Examples 2, 3, and 4 were quenched from the rolling temperature to the annealing temperature. Examples 5, 6, and 7 were air cooled from the rolling temperature to the annealing temperature.

the resulting driving force for grain growth is higher in this case.

It is interesting to note that the yield strengths of the rolled billets were unchanged after one hour anneals as high as 300° C. This is an indication of the stability of the microstructures of these samples with respect to homogeneous, thermally induced changes. Work on deformed NaCl crystals has shown, in fact, that recovery of the flow stress occurs after one hour at 350° C. R. W. Davidge and P. L. Pratt, Phys. Stat. Sol., 6, 759 (1964).

A final comment can be made concerning the room temperature grain boundary migration rates listed in Table 1. The migration rates appear somewhat high to Table 1

| Examples | Annealing Temperature (° C) | No. of Samples | Time Before Grains Were Observed (days) | Percentage of Samples With Large Grains After 8 to 10 days | Total No. of Large Grains In Samples After 8 to 10 days | Average Grain Boundary Migration Rates (μm/min) | Yield Strength (psi) |
|---|---|---|---|---|---|---|---|
| 1 | As rolled | 6 | Less than 5 | 33 | 3 | 0.5 | |
| 2 | 50 | 6 | 3 | 100 | 12 | 0.4 | — |
| 3 | 100 | 6 | Less than 4 | 16 | 1 | 0.25 | — |
| 4 | 150 | 6 | 1 | 66 | 7 | 0.6 | — |
| 5 | 50 | 5 | 3 | 80 | 5 | 0.05 | 4380 |
| 6 | 100 | 5 | Less than 4 | 80 | 11 | 0.15 | 4310 |
| 7 | 150 | 5 | Less than 4 | 80 | 6 | 0.15 | 4160 |
| 8 | 200 | 5 | 1 | 100 | 10 | 0.1 | 4080 |
| 9 | 250 | 5 | 5 | 20 | 1 | 0.25 | 4000 |
| 10 | 275 | 5 | 1 | 40 | 3 | 0.15 | 4780 |
| 11 | 300 | 5 | 14 | 0 | 0 | Not determined | 4100 |

A number of comments can be made concerning Table 1. First, in most cases an incubation period was observed before large grains formed. Furthermore, the incubation period did not appear to be systematically affected by the post forming annealing treatments. This is shown in the fourth column in Table 1. Some early observations showed the incubation time to increase with an increase in annealing temperature (e.g., between 50° C and 100° C anneals). This trend did not persist as shown in Table 1.

Second, the rate at which large grains formed was not largely affected by anneals of 200° C or less. The total number of grains observed in the samples annealed at these temperatures was not, with the exception of the billet quenched to 100° C, related to the annealing temperature. The total number of grains observed in billets annealed at temperatures higher than 200° C was low. In fact, grains were not observed in the billet annealed at 300° C after 10 days. A large grain was observed, however, in one of the samples annealed at 300° C after a period of two weeks had elapsed. The 300° C anneal, then, greatly suppressed grain growth but did not eliminate it.

Third, the grain boundary migration rates seemed to fall into two groups. In the as-rolled billet and in the billets quenched to the annealing temperature, the migration rates ranged from 0.25 to 0.6 μm/min. For billets air cooled to the annealing temperature and for those annealed at temperatures higher than the hot rolling temperature, the room temperature grain boundary migration rates ranged from 0.05 to 0.25 μm/min. In each group, the migration rates were not systematic functions of the heat treatment. The difference can be explained on the basis that the samples quenched to the annealing temperatures spent less time at the higher temperatures and recovered less. As pointed out below, be accounted for by a diffusion controlled mechanism. This is shown by the following approximate calculation.

The velocity of a migrating grain boundary can be expressed by $$V = (DFb^2/kT) \quad (1)$$

where
$D$ = diffusion coefficient
$F$ = driving force
$b$ = Burger's vector
$k$ = Boltzman's constant
$T$ = absolute temperature.

K. Lücke, R. Rixen and F. W. Rosenbaum, The Nature and Behavior of Grain Boundaries, ed. by H. Hu, Plenum, New York (1972), p. 253.

Since only the velocities of straight boundaries were measured, the driving force is just the stored energy, E, which can be approximated by $$F = \epsilon = S_v \gamma_{gb} = 2\gamma_{gb}/d \quad (2)$$

where
$S_v$ = surface to volume ratio
$\gamma_{gb}$ = grain boundary entry
$d$ = mean grain diameter C. G. Dunn and K. T. Aust, Acta Met., 5, 368 (1957).

An estimate of D can be taken from measurements made on NaCl. D. Maypother, H. M. Crooks and R. Maurer, J. Chem. Phys., 18, 1231 (1950). At room temperature $D \simeq 10^{19}$ cm$^2$/sec. Since the grain size is small, the correct value of D is most likely that for grain boundary diffusion which is on the order of $10^6$ times that for bulk lattice diffusion. P. G. Shewmon, Transformations in Metals, McGraw-Hill, New York (1969)p. 64. The grain boundary energy can be approximately by one-half the free surface energy, $\gamma_{100}$, of a (100) face of a KCl crystal, which is $\gamma_{100} = 110$ erg/cm$^2$.

A. R. C. Westwood and T. T. Hitch, J.A.P., 34, 3085 (1963). Hence, $\gamma_{gb} \simeq 55$ erg/cm$^2$.

Substituting equation (2) in equation (1) we have:

$$V = 2b^2 D \gamma_{gb}/\bar{d}kT$$

In KCl, $b$ is 4.46 A, hence, $$V \simeq 10^{-3} \mu m/min$$

The measured values of V are two to three orders of magnitude higher than this. Thus, if grain boundary diffusion is the mechanism of boundary migration, it is possible the diffusivity has been underestimated. This statement also holds for the driving force.

Figure 5:
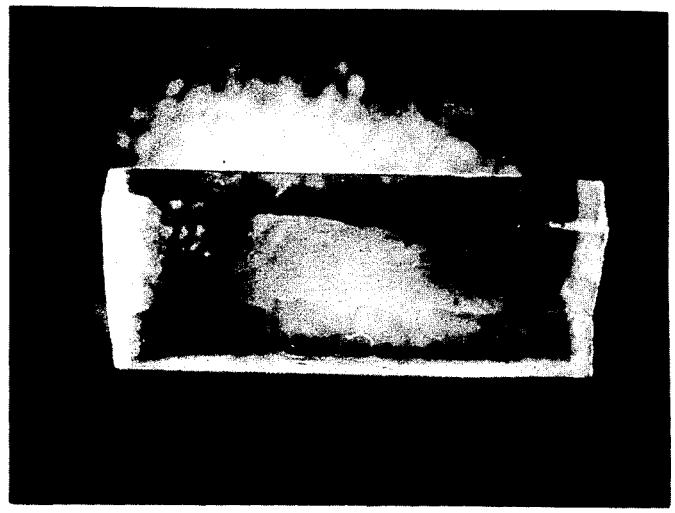
FIG. 5 is a photograph showing one type of microstructure that can be produced in a halide body by the method of the present invention.

The effects of annealing temperatures greater than 300° C on the structure and properties of rolled KCl billets have also been studied. It has been observed that annealing at higher temperatures yields a somewhat different structure. FIG. 5 is a photograph of the etched surface of a broken bend test bar from a billet which had been rolled 6 passes at 200° C, annealed 1 hour at 350° C, and air cooled. As shown in FIG. 5, the exterior regions of the billet have a small grain size. The interior portion of the billet, on the other hand, contains relatively large grains. These large grains have grown at the high annealing temperature.

The resulting structure shown in FIG. 5 has several advantages. First, the higher strain in the interior portion of the billet has been relieved by grain growth at the annealing temperature. This apparently removes the driving force for subsequent grain growth at room temperature.

Second, the exterior portions of the billet retain a small grain size, thus giving the billet the necessary structural strength. The billet may be thought of as having a hard outer shell and a somewhat softer inner region.

FIG. 5 is one example of a type of microstructure which can be produced by annealing. Other microstructures, however, are also possible.

Conclusion

A room temperature grain growth problem has been observed in hot worked pure halide billets. This grain growth tends to degrade the structural properties of hot worked halides. The present invention has shown, however, that the room temperature grain growth problem may be overcome by a heat treatment after hot working of the halide billet.

While this invention has been disclosed with particular reference to the preferred embodiments, it will be understood by those skilled in the art that changes in form and detail may be made without departing from the spirit and scope of the invention. For example, the specific temperatures described for KCl will differ somewhat for other halides.

The embodiments of the invention in which an exclusive property or right is claimed are defined as follows:

1. A method of forming a fine-grained polygonized alkali halide body consisting substantially of potassium chloride, the method comprising:

hot working an alkali halide body consisting substantially of potassium chloride to form a fine-grained polygonized body having a grain size less than 100 microns; and annealing the fine-grained polygonized body at a temperature of at least about 300° C for a time sufficient to remove a driving force of room temperature grain growth in the fine-grained polygonized body.

2. In a method of forming an optical element by hot working an alkali halide body to form a fine-grained polygonized body, wherein the alkali halide body consists substantially of potassium chloride having a grain size less than 100 microns, the improvement comprising:

heat treating the body, subsequent to the hot working, at a temperature of at least about 300° C for a time sufficient to relieve strain in the body.

3. A method consisting forming an optical element, the method comprising:

hot working a body of substantially of potassium chloride to form a fine-grained polygonized structure having a grain size less than 100 microns in the body; and annealing the fine-grained polygonized body at a temperature of at least about 300° C for a time on the order of one hour.

* * * * *